United States Patent [19]

Davis

[11] Patent Number: 4,900,090
[45] Date of Patent: Feb. 13, 1990

[54] SLAT ASSEMBLED CHAIR AND METHOD OF ASSEMBLY THEREOF

[75] Inventor: Douglas W. Davis, Brighton, Australia

[73] Assignee: Roplas Sales Pty. Ltd., Collingwood, Australia

[21] Appl. No.: 106,523

[22] Filed: Oct. 8, 1987

[51] Int. Cl.⁴ .............................................. A47C 7/00
[52] U.S. Cl. .................................. 297/440; 403/381; 5/238
[58] Field of Search ................ 297/440, 443; 108/110, 108/; 403/381; 5/238, 236 R, 236 B, 237, 294

[56] References Cited

U.S. PATENT DOCUMENTS

| | | | |
|---|---|---|---|
| 609,703 | 8/1898 | Richardson | 5/238 |
| 984,823 | 2/1911 | Linden | 5/238 X |
| 1,348,707 | 8/1920 | Gamble | 5/294 |
| 3,074,203 | 1/1963 | Paksy | 46/29 |
| 3,663,055 | 5/1972 | Gale | 297/440 |
| 4,012,155 | 3/1977 | Morris | 403/290 |
| 4,019,298 | 4/1977 | Johnson IV | 403/381 |
| 4,438,800 | 3/1984 | Hemmerle et al. | 160/371 |
| 4,504,168 | 3/1985 | Miller | 403/381 |
| 4,548,590 | 10/1985 | Green | 446/120 |
| 4,550,230 | 10/1985 | Johnson | 403/381 |

FOREIGN PATENT DOCUMENTS

| | | | |
|---|---|---|---|
| 2549912 | 2/1985 | France | 5/238 |
| 273842 | 7/1927 | United Kingdom | 403/381 |

Primary Examiner—Francis K. Zugel
Attorney, Agent, or Firm—Merchant, Gould, Smith, Edell, Welter & Schmidt

[57] ABSTRACT

A multi-piece chair includes molded side rails (12) and transverse slats (13). The ends of said slats and the side rails are detachably interfitting to form joints, each joint comprising a plug (17) (117) on the inner surface of a side rail (12), and a socket (22) (122) on the end of a slat, said slats being attached by downward movement crosswise of said side rails and detached by upward movement crosswise of said side rails.

4 Claims, 5 Drawing Sheets

SLAT ASSEMBLED CHAIR AND METHOD OF ASSEMBLY THEREOF

TECHNICAL FIELD

The invention relates to chairs of the type having transverse slats connected at their ends to opposing side rails supported on suitable legs, the slats forming the chair seat or chair back or both.

BACKGROUND AND SUMMARY OF THE INVENTION

The invention may advantageously be utilized with the type of furniture known as lawn or patio furniture, including chairs, chaise longues and the like. It has been customary to mold such chairs out of synthetic resin such as polypropylene. Most prior chairs are usually molded in one piece, but the required molds are not only large, heavy and unwieldy, but also very expensive. Moreover, shipping the one-piece chairs is laborious and expensive.

The present invention provides lightweight plastic slats detachably connected and interlocked at their ends to laterally spaced opposed side rails. Prior detachable joints between plastic parts have been difficult for the ordinary user to attach and detach in addition to being difficult and expensive to mold. Also, such joints are prone to become unsecured under stress.

It is an object of the present invention to provide a novel and improved chair having side rails with transverse slats detachably connected at their ends to the side rails for easy assembly and, if desired, disassembly.

Another object is to provide a novel and improved chair having transverse slats resiliently interlocked with the side rails by a snap-in action.

A further object is to provide an improved detachable joint having novel interfitting plug and socket elements connecting the slats and side rails, which joint is economically and easily molded.

A still further object is to provide a novel and improved chair having parts which are inexpensive to mold and transport and readily assembled and disassembled by the ultimate user without the use of tools or separate fasteners.

It is yet another object of the present invention to provide an improved chair in which the side rails are molded separately from the slats and therefore may be made of different materials.

These and other objects are accomplished by the improved parts, constructions and methods comprising the present invention, preferred embodiments of which are disclosed in the drawings and description hereof as being the best known mode of carrying out the invention. Various modifications and changes in details of construction are comprehended within the scope of the appended claims.

DESCRIPTION OF PREFERRED EMBODIMENTS

Figure 1:
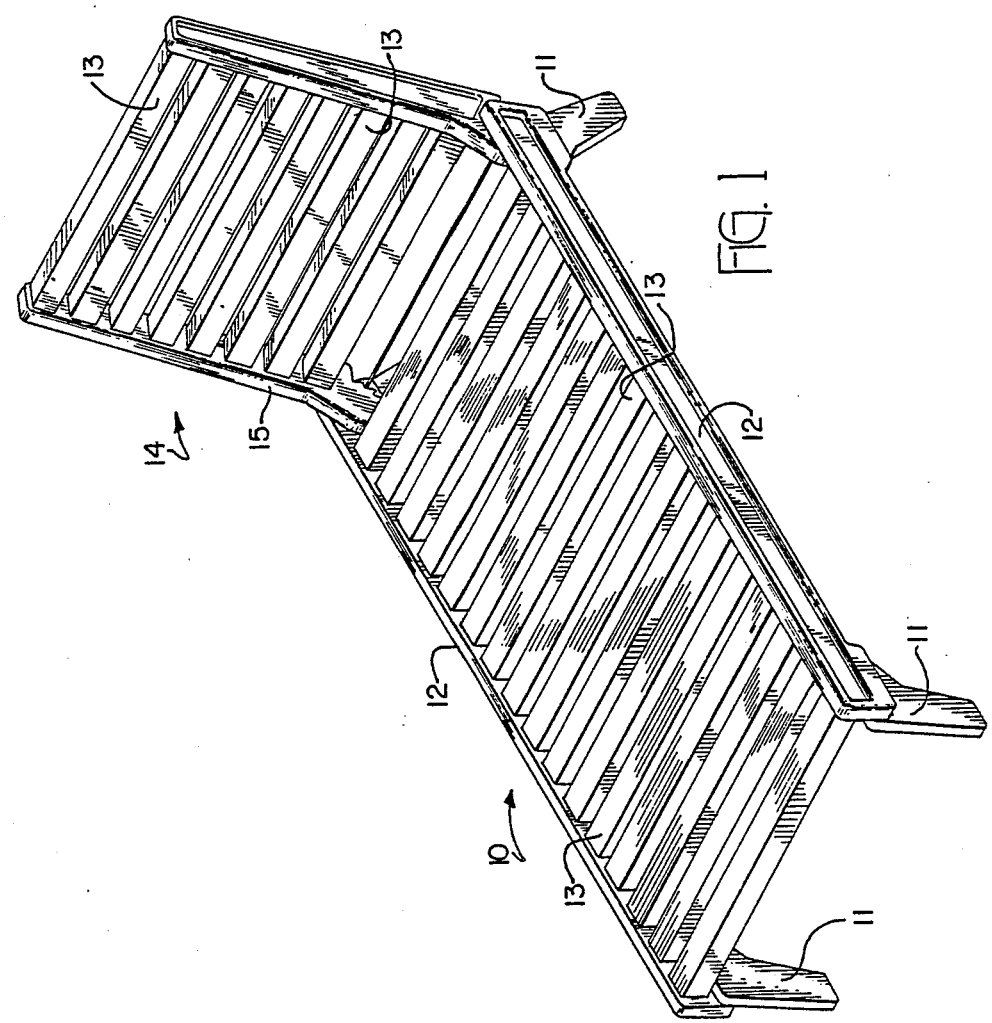
FIG. 1 is a perspective view of a chaise longue type of chair embodying the present invention.
Figure 2:
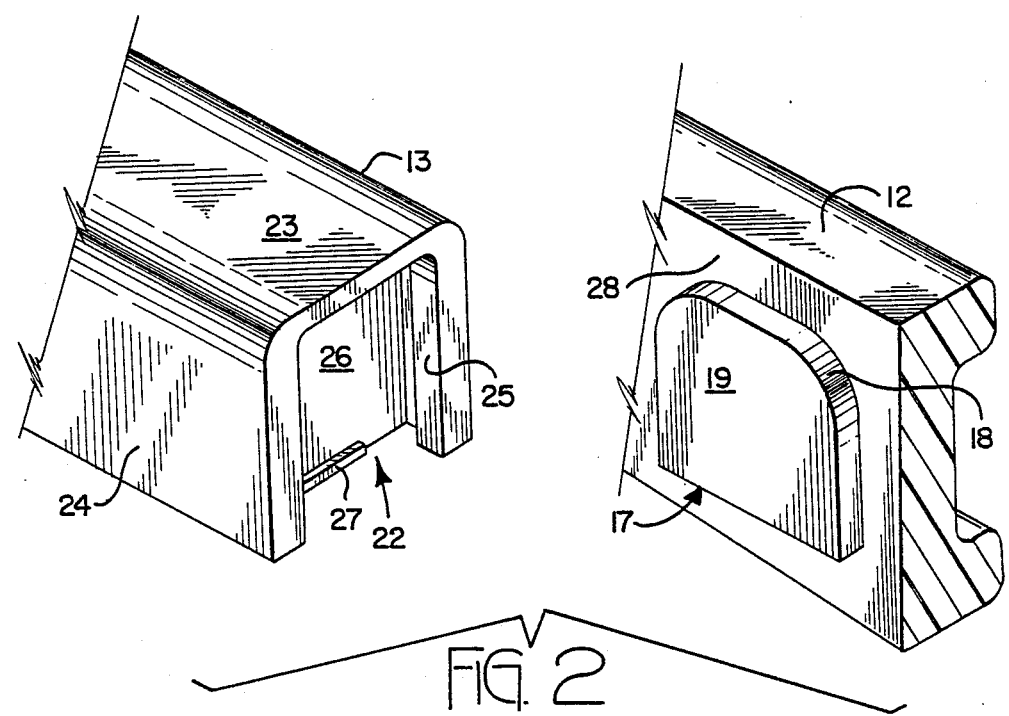
FIG. 2 is an exploded enlarged view showing fragmentarily one embodiment of the novel plug and socket parts mounted on a side rail and one end of a juxtaposed slat.
Figure 3:
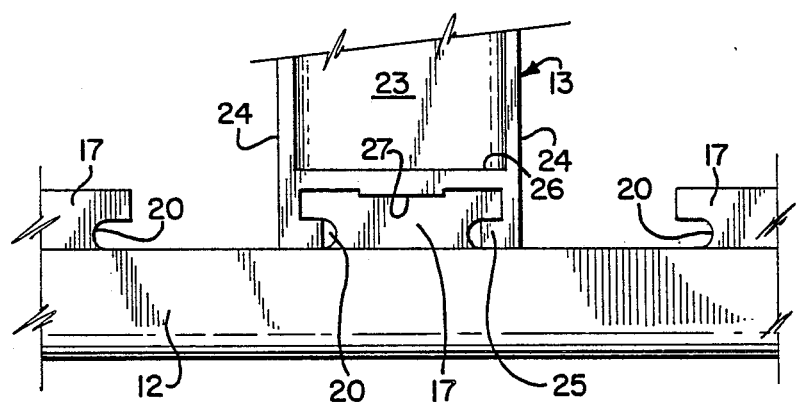
FIG. 3 is a fragmentary bottom plan view showing the end of a slat connected to a side rail by the novel plug and socket joint.

The chaise longue chair shown in FIG. 1 has a seat portion indicated generally at 10 having supporting legs 11 attached to side rails 12 with a plurality of transverse slats 13 connecting the side rails. The chair also includes an inclined back portion indicated generally at 14 having side rails 15 suitably attached to the side rails 12 and having additional transverse slats 13 connecting the side rails 15.

Preferably, the rails, legs and slats are molded of synthetic resin material formulated to provide substantial rigidity to the legs 11 and side rails 12 and 15, and to provide a certain amount of resilience to the slats 13 for purposes to be described. Polypropylene is suitable for this purpose. However, because side rails 12 and 15 are molded separately from slats 13, an advantage of this invention is that they may be made of different materials. For example, side rails 12 and 15 may be made of a more rigid material than slats 13, such as structural foam, with slats 13 being made, for comfort, of the more resilient polypropylene. Furthermore, as shown in the drawings, the slats are preferably generally of inverted U-shape in cross-section, and the upper webs thereof may be slightly dished to further enhance the comfort of a person resting thereon.

As shown in FIGS. 2-5, side rails 12 and 15 in one preferred embodiment are provided along their inner surfaces with longitudinal rows of uniformly spaced projections or plugs 17. These plugs are preferably generally rectangular with curved upper edges 18 and flat inner surfaces 19. Each plug has a groove 20 extending continuously around its upper and side edges.

The ends of each slat are provided with sockets for slidably receiving the plugs. Each socket, indicated generally at 22, has an inverted U-shape formed by end extensions of the top web 23 and side walls 24 of the slat. Inturned ribs 25 are formed on the end of each socket and these ribs 25 are adapted to be slidably received in the side portions of groove 20 of a plug 17, thereby preventing relative movement transversely of the side rail. The back of each socket is closed by a thin resilient wall 26 spaced inwardly of the ribs 25 and adapted to slidably abut the flat surface 19 of the plug. At the bottom edge of wall 26 on the surface facing outwardly of each socket 22, a short narrow rib 27 is formed.

Figure 4A:
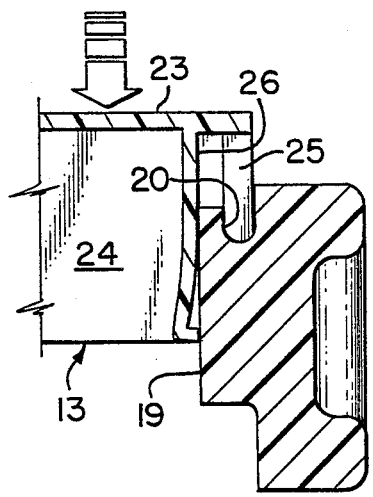
FIG. 4a is a fragmentary cross-sectional view showing the novel end socket of a slat partially engaged with a plug on a side rail.
Figure 4B:
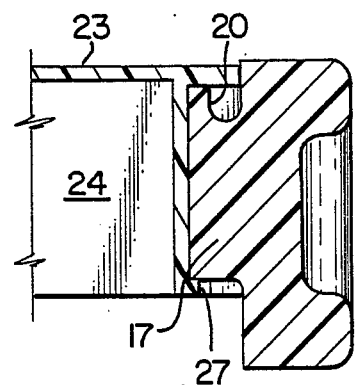
FIG. 4b is a similar view showing the socket and plug fully engaged.
Figure 5:
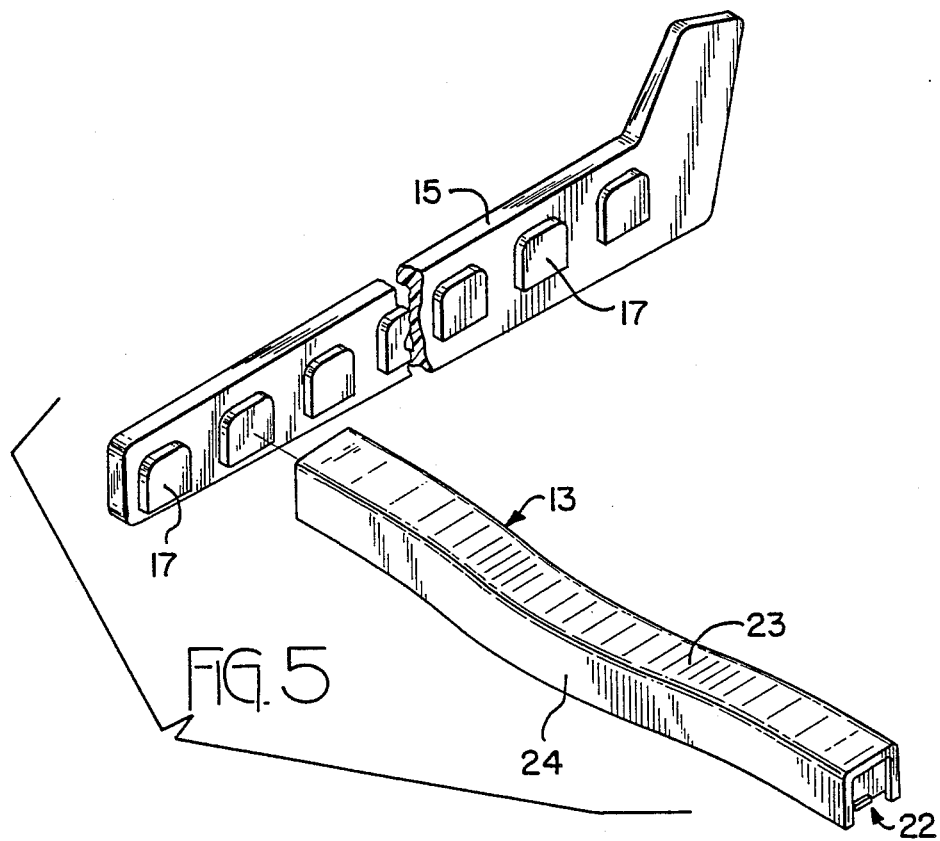
FIG. 5 is an enlarged exploded perspective view of the first embodiment, showing the inner side of a side rail and one of the slats in juxtaposed position.
Figure 6:
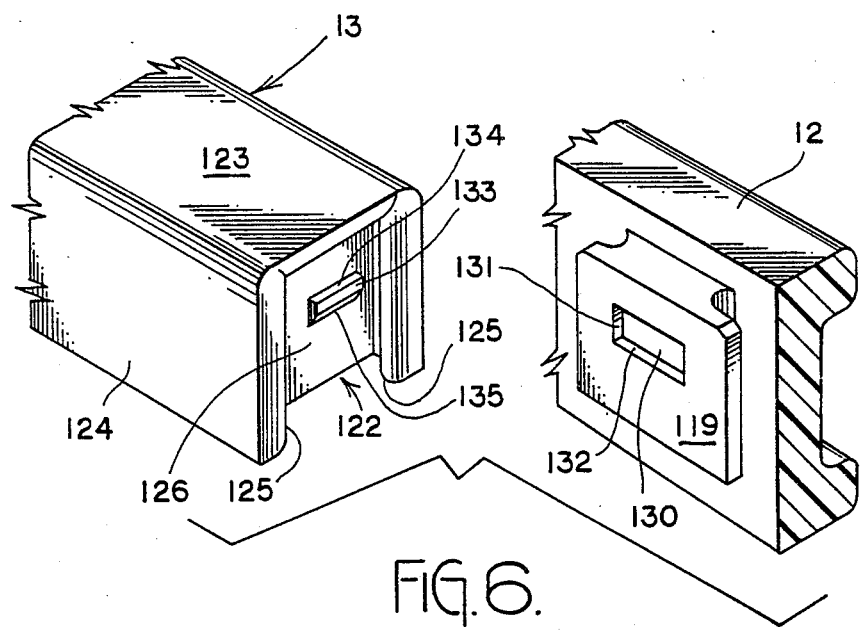
FIG. 6 is an exploded enlarged view similar to FIG. 2, showing fragmentarily an alternate embodiment of the novel plug and socket parts mounted on a side rail and one end of a juxtaposed slat.
Figure 7:
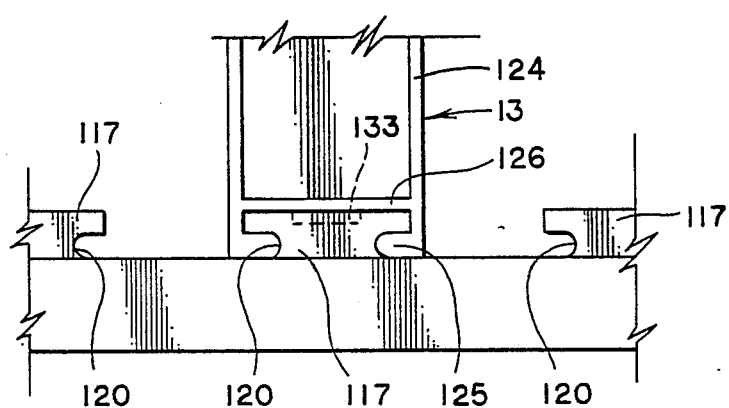
FIG. 7 is a bottom plan view similar to FIG. 3, showing the plug and socket parts of the alternate embodiment fully connected.

Referring particularly to FIGS. 4a and 4b, to attach the slats 13 to the side rails, the end ribs 25 of each slat 13 are abutted against the inner surfaces 28 of the opposing side rails 12 around and above the plugs 17 to be slidably engaged. The ends of the slat are then pushed downwardly forcing each rib 27 to cam over the upper edge 29 of the plug by flexing the wall 26 causing the ribs 25 to slidably enter the side portions of the groove 20, as shown in FIG. 4a. When the end extension forming the top wall of the socket abuts the upper edge of the plug, the rib 27 snaps under the bottom edge of the plug, as shown in FIG. 4b, due to the resilience of the wall 26, thus interlocking the slat with the side rail.

Accordingly, the operation of assembling the slats and side rails can easily be done by an ordinary person without the need of any tools or fasteners such as bolts, screws, clips or the like.

Disassembly can be easily and quickly accomplished by bumping the underside sides of the ends of the slats upwardly, causing the ribs 27 to cam over the bottom edges of the plugs and flexing the resilient walls 26 of the sockets to quickly slide the ends of the slats free of the rails, again without the need of any tools or of loosening fasteners. The rib 27 may be slightly rounded to facilitate the camming action as it snaps into and out of engagement with the plug.

Referring to FIGS. 6, 7, 8a and 8b, the side rails 12 and 15 of the alternate embodiment are provided along their inner surfaces with longitudinal rows of longitudinally spaced projections or plugs 117. These plugs are preferably rectangular with flat inner surfaces 119. Each plug has vertical side grooves 120 extending continuously along its side edges.

The ends of each slat are provided with sockets indicated generally at 122 for slidably receiving the plugs 117. Each socket has an inverted U-shape formed by extensions of the top web 123, and side walls 124 of the slat. Inturned vertical ribs 125 are formed on the end of each socket and the ribs 125 are adapted to be slidably received in the side grooves 120 of a plug 117, thereby preventing relative movement transversely of the side rail. The back of each socket 120 is closed by a thin resilient wall 126 spaced inwardly of the ribs 125 and adapted to slidably abut the flat surface 119 of the plug.

Medially of the inner flat surface of each plug 117 is formed a horizontal recess 130 having flat side wall surfaces 131 and 132 perpendicular to the flat inner surface 119 of the plug. Medially of the interfacing surface of each socket back wall 126 is formed a projecting horizontal rib 133 adapted to be received in said recess 130 when a slat is pushed downwardly to force a socket 120 over a plug 117, as shown in FIGS. 8a and 8b.

Figure 8A:
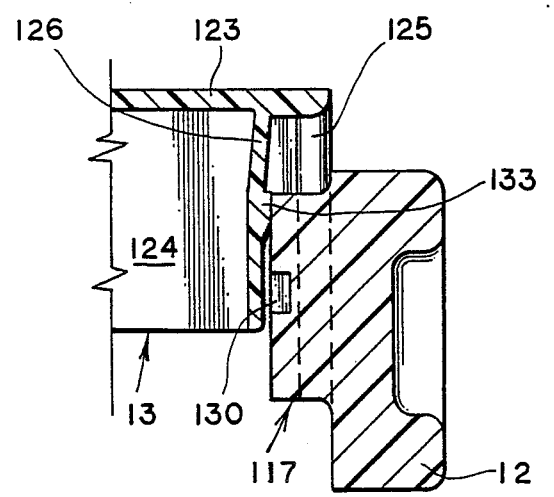
FIG. 8a is a fragmentary cross-sectional view similar to FIG. 4a, showing the plug and socket parts of the alternate embodiment partially connected.
Figure 8B:
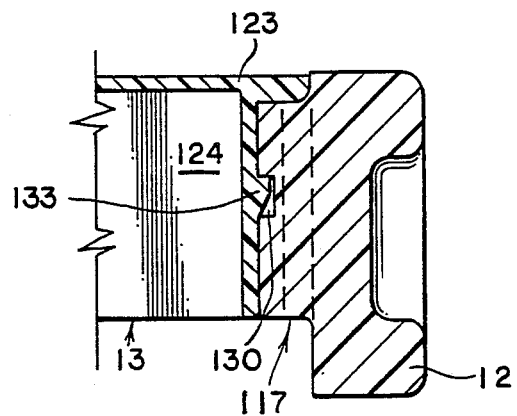
FIG. 8b is a similar view, showing the plug and socket parts of the alternate embodiment fully engaged.

Preferably, the rib 133 has a flat upper edge 134 and a beveled lower edge 135 (see FIG. 6) so that as the slat is pushed downwardly the rib slides over the upper edge of the plug 117 as seen in FIG. 8a, and when the extended end forming the top wall of the socket abuts the upper edge of the plug the rib 133 snaps into the recess 130, with its upper edge engaged and interlocked with the upper edge of the recess, as shown in FIG. 8b.

Obviously, by a mere reversal of parts, the sockets could be formed on the side rails and the plugs formed on the ends of the slats while obtaining precisely the same advantageous results.

It is apparent that the novel multi-piece chair disclosed herein accomplishes all of the foregoing stated objects and otherwise improves the art.

I claim:

1. A multi-piece chair comprising side rails each having an opposed inner surface, transverse slats providing load bearing surfaces, the ends of said stats and said side rails being detachably interconnected to form interlocked joints at the ends of said stats with their respective inner surface of the side rail, each of said joints including a plug formed integrally with said side rail and having a front face spaced from said inner surface to form a socket in the spaced defined between said inner surface and said front face, said slats including an interfitting socket formed integrally at each end thereof, said socket having a back wall at each end being bounded by an outwardly extending top wall and two opposing side walls each having ribs, thereby defining an open end and a slot between said back wall and said ribs, said slot being sized to receive said plug, a cam rib extending outwardly from said back wall at a point opposite but distant from said top wall, whereby said slats may be attached to said rails by sliding said plug into the slot over the resistance of the cam rib and whereby said slats may be removed by like reverse action, and wherein said back wall is constructed from a material having greater resilience than said front face on said plug.

2. A chair according to claim 1 wherein said cam rib is positioned at an edge of the slat.

3. A chair according to claim 1 wherein said cam rib is positioned on said back wall distant from an edge of said slat and wherein said side rail includes a recess in its front face, said recess being positioned so that it will receive said cam rib when said slat and side rail is engaged.

4. A chair according to claim 3 wherein said back wall has a sloped portion extending from said top wall to said cam rib and a generally planar portion extending from said cam rib to said open end.

* * * * *